United States Patent
Schultz

(10) Patent No.: US 9,148,280 B2
(45) Date of Patent: Sep. 29, 2015

(54) METHOD AND SYSTEM FOR PROVIDING SECURE, MODULAR MULTIMEDIA INTERACTION

(75) Inventor: Paul T. Schultz, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 221 days.

(21) Appl. No.: 13/248,280

(22) Filed: Sep. 29, 2011

(65) Prior Publication Data
US 2013/0086633 A1 Apr. 4, 2013

(51) Int. Cl.
| | |
|---|---|
| H04L 9/00 | (2006.01) |
| H04L 29/06 | (2006.01) |
| H04W 88/06 | (2009.01) |
| H04M 1/725 | (2006.01) |
| H04N 21/41 | (2011.01) |
| G02B 27/01 | (2006.01) |
| H04W 4/02 | (2009.01) |
| G06F 1/16 | (2006.01) |
| H04L 12/28 | (2006.01) |

(52) U.S. Cl.
CPC .............. H04L 9/00 (2013.01); H04L 12/287 (2013.01); H04L 12/2858 (2013.01); H04L 63/08 (2013.01); *G02B 27/017* (2013.01); *G02B 2027/0178* (2013.01); *G06F 1/1632* (2013.01); *H04L 12/2856* (2013.01); *H04M 1/72547* (2013.01); *H04N 21/4126* (2013.01); *H04W 4/02* (2013.01); *H04W 88/06* (2013.01)

(58) Field of Classification Search
CPC ... H04M 1/72547; H04W 88/06; H04W 4/02; G02B 2027/0178; G02B 27/017; G06F 1/1632; H04N 21/4126
USPC .............................................................. 726/2
See application file for complete search history.

(56) References Cited

U.S. PATENT DOCUMENTS

| | | | | |
|---|---|---|---|---|
| 5,815,669 | A * | 9/1998 | Lee et al. | 709/238 |
| 7,512,098 | B2 * | 3/2009 | Jiang et al. | 370/329 |
| 7,899,500 | B2 * | 3/2011 | Kreiner et al. | 455/569.1 |
| 8,006,002 | B2 * | 8/2011 | Kalayjian et al. | 710/36 |
| 8,275,924 | B2 * | 9/2012 | Krueger et al. | 710/303 |
| 8,401,473 | B2 * | 3/2013 | Tang et al. | 455/41.2 |
| 8,412,857 | B2 * | 4/2013 | Ady et al. | 710/8 |
| 8,731,519 | B2 * | 5/2014 | Flynn et al. | 455/410 |
| 8,902,315 | B2 * | 12/2014 | Fisher et al. | 348/164 |
| 2003/0078071 | A1 * | 4/2003 | Uchiyama | 455/557 |
| 2006/0015556 | A1 * | 1/2006 | Pounds et al. | 709/203 |
| 2007/0086724 | A1 * | 4/2007 | Grady et al. | 386/46 |
| 2008/0058023 | A1 * | 3/2008 | Seshadri et al. | 455/569.1 |
| 2008/0140868 | A1 * | 6/2008 | Kalayjian et al. | 710/8 |
| 2008/0280647 | A1 * | 11/2008 | Wasserman | 455/557 |
| 2009/0061841 | A1 * | 3/2009 | Chaudhri et al. | 455/420 |
| 2009/0111518 | A1 * | 4/2009 | Agrawal et al. | 455/557 |

(Continued)

Primary Examiner — James Turchen

(57) ABSTRACT

An approach is provided for the secure exchange of multimedia content through a mobile telephony device. A docking station receives a control signal from a media headset, and in response thereto determines to establish a communication link. The docking station selects one of a plurality of communication options corresponding to different networks based on the type of the communication link. The docking station initiates an authentication procedure for the communication link according to the selected communication option. Subsequent to successful authorization, the docking station receives multimedia content over the authenticated communication link, and transmits the received media signal to the media headset.

15 Claims, 12 Drawing Sheets

(56) References Cited

U.S. PATENT DOCUMENTS

| | | | |
|---|---|---|---|
| 2009/0163179 A1* | 6/2009 | Brannan et al. | 455/412.2 |
| 2009/0251409 A1* | 10/2009 | Parkinson et al. | 345/156 |
| 2009/0313014 A1* | 12/2009 | Shin | 704/235 |
| 2010/0245585 A1* | 9/2010 | Fisher et al. | 348/164 |
| 2010/0268831 A1* | 10/2010 | Scott et al. | 709/228 |
| 2011/0029385 A1* | 2/2011 | Engel et al. | 705/14.53 |
| 2011/0053643 A1* | 3/2011 | Shmunis | 455/556.1 |
| 2011/0116619 A1* | 5/2011 | Bjorkner et al. | 379/315 |
| 2011/0130167 A1* | 6/2011 | Parlamas et al. | 455/552.1 |
| 2011/0162035 A1* | 6/2011 | King et al. | 726/1 |
| 2011/0213664 A1* | 9/2011 | Osterhout et al. | 705/14.58 |

* cited by examiner

METHOD AND SYSTEM FOR PROVIDING SECURE, MODULAR MULTIMEDIA INTERACTION

BACKGROUND INFORMATION

Cellular telephones are increasingly being used for a variety of multimedia applications, including video-conferencing, playing music, displaying videos, browsing the web, and the like. Because cellular telephones are portable, multimedia content may be transferred to and from cell phones in a variety of environments. For example, a user may wish to access audio-visual content at home, at work, or in the car. These different environments have different resources that could be used to either generate multimedia content or to provide it to users. Continuing with the above example, the home environment may include a television display and stereo loudspeakers, while the car environment may include only car stereo speakers. Yet, according to current technology, these different environmental resources cannot be efficiently utilized to assist with the exchange of multimedia content through a cellular telephone. Instead, cell phone users tend to interact with their cell phones in a manner that is independent of the environment, which often proves inconvenient.

Therefore, there is a need for an approach that can safely, securely and efficiently provide cell phone enabled multimedia communication services in a wide variety of environments.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing secure, modular multimedia interaction services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to certain types of communication devices, it is contemplated that various exemplary embodiments are also applicable to other devices, entities, facilities, systems, etc.

Figure 1:
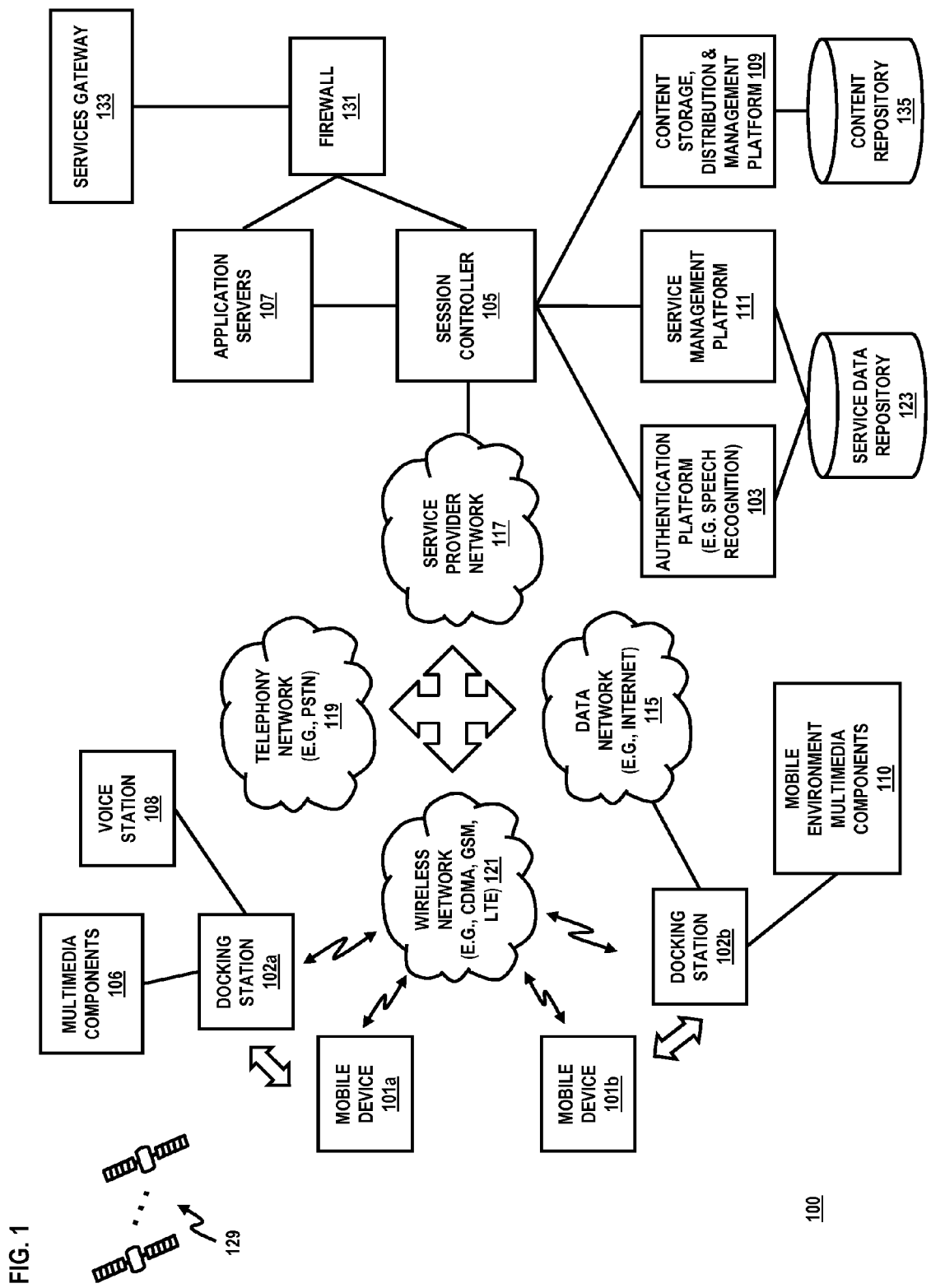
FIG. 1 is a diagram of a system configured to provide secure, modular multimedia interaction services, according to an exemplary embodiment.

FIG. 1 is a diagram of a system configured to provide secure, modular multimedia interaction services, according to an exemplary embodiment. For the purposes of illustration, system 100 for providing secure, modular multimedia interaction services is described with respect to mobile devices 101a and 101b, docking stations 102a and 102b, voice station 108 and mobile environment multimedia components 110. However, it will be appreciated that the system 100 may include any number of communication devices and docking stations, and encompass any type of environment, whether mobile or stationary.

The expansion of cell phone enabled multimedia services carries risk for cell phone providers. Multimedia content is relatively expensive to transmit over a network. Therefore, unauthorized access to cell phone multimedia services could prove costly to cell phone providers. Further, security breaches of a service provider's network could compromise the privacy of legitimate network users. There is thus a need to enhance the security of cell phone enabled multimedia services.

Cell phone user safety is yet another issue. Cell phones include a relatively high power transceiver to communicate with remote cell phone towers. This has led to concerns that the proximity of cell phone transceivers to users' bodies may cause various health problems. Although the link between cell phone use and disease has not been established, it would be desirable to remove the concern from users' considerations of whether to use cell phones.

The above issues are addressed, according to certain embodiments, by the arrangement of mobile devices and docketing stations to safely, securely and efficiently provide cell phone enabled multimedia communication services.

In exemplary embodiments, users of the mobile devices 101a or 101b may access multimedia services through docking stations 101a and 101b, respectively. The docking station 102a, which is within a stationary environment, couples (e.g., wirelessly) to the mobile device 101a, and receives user input from multimedia components 106 that may comprise a headset such as the one described below with reference to FIG. 7. The docking station 101a can also communicate directly with a voice station 108. The docking station 102b, which can be deployed, e.g., in an automobile, interfaces with mobile device 101b and multimedia components 110 that are suitable for an automobile environment.

In exemplary embodiments, users of the mobile devices 101a or 101b interact with multimedia components 106 or 110, which generate control signals that are provided to docking stations 102a and 102b, respectively. In response to the control signals, the docking stations 102a and 102b determine to establish communication links with a wireless network 121, a telephony network 119, a data network 115, or a combination of any of the foregoing. The docking stations 102a and 102b then initiate appropriate authentication procedures for the communication link (or links).

An authentication platform 103 may perform some or all of the authentication procedures. The docking stations 102a and 102b may also perform a portion of the authentication process, as will be further described below with respect to FIG. 4. Finally, authentication may be performed at the level of the access networks 115, 117, 119 and 121. In this case, when one of the mobile devices 101a or 101b, or one of the docking stations 102a or 102b, attempts to initiate a session with the session controller 105, whichever of the networks 115, 117, 119 or 121 serves as the initial access point may attempt to determine whether the device is authorized to access that particular network.

On the service provider's side, a session controller 105 coordinates authentication, provision of multimedia services and all other aspects of a user session. The session controller interfaces with application servers 107, authentication platform 103, a content, storage and distribution management platform 109 and a service management platform 111. The content, storage and distribution management platform 109 can utilize a content repository 135 to store data. The service management subsystem 111 can also access a service data repository 123. The application servers 107 communicates with services gateway 133 through a firewall 131, which enables the exchange of multimedia content between an external network (such as the global Internet) and the mobile devices 101a and 101b and/or respective docking stations 102a and 102b.

According to exemplary embodiments, the session controller 105, application servers 107, the platforms 103, 109 and 111 and the networks 115, 117, 119 and 121 are connected according to the Internet Protocol (IP) Multimedia Subsystem (IMS) architectural framework. According to IMS, service components (e.g., application servers 107) are isolated from access networks (e.g. service provider network 117) by a horizontal service layer (session controller 105). In this manner, multimedia content may be efficiently exchanged within a network that operates according to the IP protocol.

If a user is successfully authenticated, audio and video data that are provided by application servers 107 may be sent/received to/from the mobile devices 101a or 101b and/or corresponding docking stations 102a and 102b through a service provider network 117 and the communication link (or links) established by the docking stations 102a and 102b, respectively. Similarly, audio and video data may be exchanged between the content repository 135 and the mobile devices 101a or 101b and/or corresponding docking stations 102a and 102b.

Mobile devices 101a and 101b and docking stations 101a and 101b may exchange any type of audiovisual data, including data associated with phone calls and/or teleconferences, with any type of device, including other mobile devices (whether or not part of the system 100), land lines, laptop or desktop computers, servers, or other network enabled devices. The target device may be uniquely identified based on, for instance, telephone number, one or more extensible resource identifiers (XRI), internet protocol (IP) addresses, uniform resource identifiers (URI), uniform resource locators (URL), hypertext transfer protocol (HTTP) addresses, or other suitable addresses, identifiers, or locators.

Service data repository 123 stores subscriber information, such as billing information, contact information, demographic information, location information, mobile device configurations, subscription parameters, authorization information and the like. Content repository 135 stores multimedia content associated with particular mobile devices and/or end users. According to exemplary embodiments, repositories 123 and 135 may be maintained by a service provider of the multimedia services of system 100 or may be maintained by any suitable third-party. It is contemplated that the physical implementation of repositories 123 and 135 may take on many forms, including, for example, portions of existing repositories of a service provider, new repositories of a service provider, third-party repositories, and/or shared-repositories. As such, repositories 123 and 135 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 123 and 135 are provided in distributed fashions, information and content available via repositories 123 and 135 may be located utilizing any suitable querying technique, such as electronic number matching, distributed universal number discovery (DUNDi), uniform resource identifiers (URI), universal description discovery and integration (UDDI), etc.

As seen in FIG. 1, service provider network 117 enables mobile devices 101a and 101b to access the multimedia features and functions of system 100 via one or more of networks 115-121. Networks 115-121 may be any suitable wireline and/or wireless network. For example, telephony network 119 may include a circuit-switched network, such as the public switched telephone network (PSTN), an integrated services digital network (ISDN), a private branch exchange (PBX), or other like network. Wireless network 121 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 115-121 may be completely or partially contained within one another, or may embody one or more of the aforementioned infrastructures. For instance, service provider network 117 may embody circuit-switched and/or packet-switched networks that include facilities to provide for transport of circuit-switched and/or packet-based communications. It is further contemplated that networks 115-121 may include components and facilities to provide for signaling and/or bearer communications between the various components or facilities of system 100. In this manner, networks 115-121 may embody or include portions of a signaling system 7 (SS7) network, or other suitable infrastructure to support control and signaling functions. As such, the conjunction of networks 115-121 may be adapted to facilitate the secure, modular multimedia interaction services of system 100.

It is noted that system 100 may also include satellite positioning system (SPS) technology, such as GPS technology; however, any other suitable navigational or location determination technology may be utilized, such as advanced forward link trilateration (A-FLT), assisted-GPS (A-GPS), enhanced cellular identification (CELL-ID), wireless area network (WLAN) positioning, etc. According to exemplary embodiments, the SPS technology of system 100 may be configured to utilize a constellation 129 of satellites that transmit signals to receivers (not shown) of, for example, one or more mobile devices 101a and 101b, so that the receivers may determine corresponding spatial positioning information (or locations), speeds, directions, and/or timing for mobile devices 101a and 101b. As such, mobile devices 101a and 101b may be configured to report this spatial positioning information to, for instance, session control module 105 to facilitate presence determinations and/or carrying out one or more actions specified by a control message.

According to exemplary embodiments, mobile devices 101a and 101b may include any customer premise equipment (CPE) capable of sending and/or receiving information over one or more of networks 115-121. For instance, voice station 108 may be any suitable plain old telephone service (POTS) device, facsimile machine, etc., whereas mobile devices 101a or 101b may be any cellular phone, radiophone, satellite phone, smart phone, wireless phone, or any other suitable mobile device, such as a personal digital assistant (PDA), pocket personal computer, tablet, customized hardware, sensor, etc. Mobile devices 101a or 101b each may comprise a VoIP phone, skinny client control protocol (SCCP) phone, session initiation protocol (SIP) phone, IP phone, softphone etc. Even though only two mobile devices 101a and 101b are illustrated, it is contemplated that system 100 can support a very large number of mobile devices.

Figure 2B:
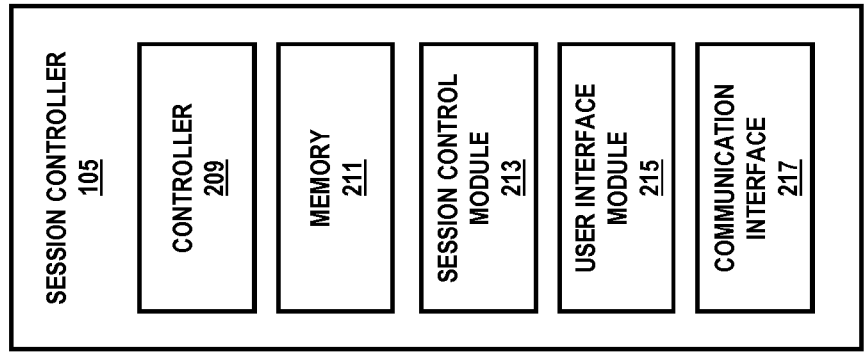
FIGS. 2A-2D are respective diagrams of an authentication platform, a session controller, a content storage, distribution and management platform, and a service management platform that are configured to facilitate secure, modular multimedia interaction services, according to various exemplary embodiments.
Figure 2A:
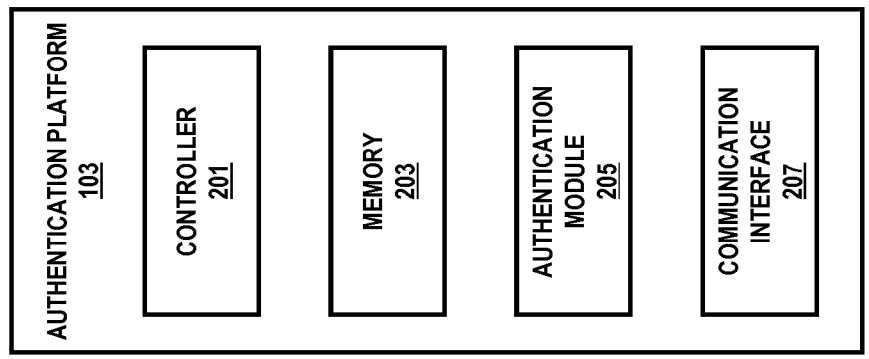

FIG. 2A is a diagram of an authentication platform that is configured to facilitate secure, modular multimedia interaction services, according to various exemplary embodiments. Authentication platform 103 may comprise computing hardware (such as described with respect to FIG. 10), as well as include one or more components configured to execute the processes described herein to facilitate the docking station based multimedia services of system 100. In one implementation, authentication platform 103 includes authentication module 205, communication interface 207, controller (or processor) 201, and memory 203. Authentication platform 103 may also communicate with one or more service data repositories, such as service data repository 123 (FIG. 1). Users may access authentication platform 103 (or the features and functionalities provided thereby) via mobile devices 101a and 101b and/or docking stations 102a and 102b. While specific reference will be made to this particular implementation and the particular implementations shown in FIGS. 2B-2D, it is also contemplated that authentication platform 103 as well as platforms 109 and 111 may embody many forms and include multiple and/or alternative components. For example, it is contemplated that the components of these platforms may be combined, located in separate structures, or separate locations.

According to one embodiment, authentication platform 103 embodies one or more application servers accessible to mobile devices 101a and 101b, and associated docking stations 102a and 102b, over one or more networks 115-121. Users (or subscribers) can access authentication platform 103 to create, customize, and manage one or more user profiles for the purpose of registering mobile devices 101a and 101b, and associated docking stations 102a and 102b, with the multimedia services of system 100. After such registration, authentication platform 103 may determine whether subsequent attempts to access the system 100 through the registered account are valid.

Controller 201, in conjunction with one or more instructions (or computer program code) stored to, for example, memory 203, may cause authentication platform 103 to store credential information associated with particular users and devices in the service data repository 123 (FIG. 1). According to exemplary embodiments, the communications devices 101a and 101b are associated with unique identifiers, such as electronic serial numbers, international mobile equipment identifiers, machine access control addresses, mobile directory numbers, mobile equipment identities, mobile identification numbers, internet protocol addresses port address, and/or any other suitable address or identifier.

The authentication data, which is provided to the service data repository through communication interface 207, may include, without limitation, "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Subscribers may provide this information via communication devices 101a and 101b, such as by spoken utterances, dual-tone multi-frequency (DTMF) signals, packetized transmission, etc. Other types of biometric authentications based on images (e.g. fingerprints, retinal images) are possible due to the visual input capabilities of multimedia components 106 and 110 (FIG. 1), which will be further described with reference to FIGS. 4 and 7. It is contemplated that unobtrusive security may be provided by positively identifying and screening users based on one or more of the aforementioned credentials which may be seamlessly provided when communication devices 101a and 101b communicate with authentication platform 103, such as a unique IP or MAC address. Other unobtrusive measures can be made available via voice prints, etc.

FIG. 2B is a diagram of a session controller that is configured to facilitate secure, modular multimedia interaction services, according to various exemplary embodiments. Session controller 105 may comprise computing hardware (such as described with respect to FIG. 10), as well as include one or more components configured to execute the processes described herein to facilitate the docking station based multimedia services of system 100. In one implementation, session controller 105 includes session control module 213, user interface module 215, communication interface 217, controller (or processor) 209, and memory 211.

Session controller 105 opens, closes and otherwise manages multimedia sessions between end user devices, such as communication devices 101a and 101b, and service side applications, including authentication platform 103, service management platform 111, content storage, distribution and management 109 and application servers 107. Session controller 105 receives requests to initiate multimedia sessions from mobile devices 101a and 101b, either directly or through corresponding docking stations 102a and 102b. Specifically, communication interface 217 receives such requests through the service provider network 117 (FIG. 1). Session control module 213 then causes the communication interface 217 to send an authentication request to the authentication platform 103. Depending on the outcome of the authentication process, session controller 105 either sends an authentication failure message to mobile devices 101a and 101b, or initiates the provision of multimedia services by communicating with content storage, distribution and management 109 and/or application servers 107. Session controller 105 also communicates with service management platform 111 to enable tracking of customer specific usage information for billing and other purposes.

Audiovisual content may be provided by a number of different sources, such as content storage, distribution and management platform 109 (FIG. 1) or a public network such as the Internet 115 accessed through the service gateway 133. Session controller 105 ensures that the audiovisual content from any combination of sources is properly synchronized. The synchronization may occur in a variety of contexts, including, for example, web conferencing, television, and the provision of other audiovisual content.

In exemplary embodiments, session controller 105 via, for instance, user interface module 215 may be configured to execute one or more graphical user interfaces (GUI) that are configured to provide users with one or more menus of options for creating, customizing, and managing user profiles, as well as engaging with the other features and functions of the system 100.

Figure 2D:
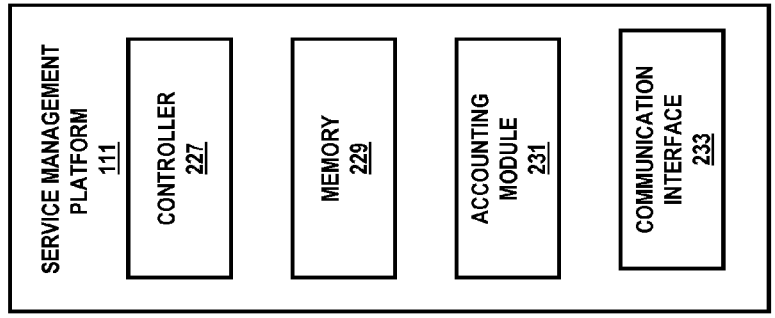
Figure 2C:
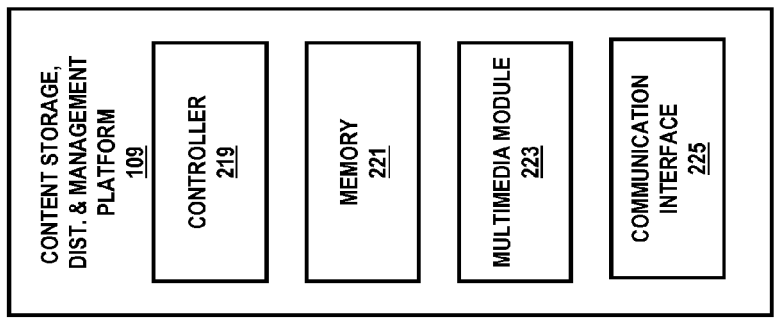

FIG. 2C is a diagram of a content storage, distribution and management platform that is configured to facilitate secure, modular multimedia interaction services, according to various exemplary embodiments. The platform 109 may include computing hardware (such as described with respect to FIG. 10), as well as include one or more components configured to execute the processes described herein to facilitate the docking station based multimedia services of system 100. In one implementation, platform 109 includes multimedia module 223, communication interface 225, controller (or processor) 219, and memory 221. Content storage, distribution and management platform 109 accesses content repository 135 (FIG. 1) to both store and retrieve content through communication interface 225. Platform 109 also communicates with the session controller 105.

In particular, data storage or retrieval requests initiated by a communication device 101a or 101b through an associated docking station 102a or 102b are received by session controller 105, which routes them to platform 109. Any type of data may be associated with the request. For example, an end user may wish to upload and save a picture, a video with or without associated audio content, or a web page. For data storage requests, the data is received by the platform 109 from control device 105 through communication interface 225. The multimedia module 223 causes the controller 219 to store the data in memory 221. The multimedia module 223 then determines the appropriate storage location for the information based on the identity of the communication device 101a or 101b. As such, platform 109 via, for example, communication interface 225 may transmit the data to content repository 135 in association with one or more unique identifiers or addressing information corresponding to particular communications devices 101a or 101b, such as one or more directory addresses, electronic serial numbers, international mobile equipment identifiers, machine access control addresses, mobile directory numbers, mobile equipment identities, and the like.

The multimedia module 223 may also generate a tag for the data that will enable later retrieval of the data by the communication device 101a or 101b. The tag may be transmitted by the platform 109 through communication interface 225 to session controller 105, which in turn transmits the tag to the pertinent communication device 101a or 101b. The tag may be stored in the pertinent communication device 101a or 101b along with a representation, such as an icon and/or a sound, which enables an end user to associate the representation with the data. For example, if the data comprises a picture, the representation may be a thumbnail version of the picture, or a description input by the end user to the pertinent communication device 101a or 101b.

For data retrieval requests, the representation is accessed and the pertinent communication device 101a or 101b retrieves the corresponding data tag, and transmits it to the session control device 105 through the corresponding docking station 102a or 102b. The tag is received by the platform 109 from session controller 105 through communication interface 225. The multimedia module 223 causes the controller 219 to store the data in memory 221. The multimedia module 223 then determines the storage location for the data based on the tag, and retrieves the data from the content repository 135. The data is then sent by platform 109 to session controller 105 for transmission to the pertinent communication device 101a or 101b through the associated docking station 102a or 102b.

FIG. 2D is a diagram of a service management platform that is configured to facilitate secure, modular multimedia interaction services, according to various exemplary embodiments. Service management platform 111 may comprise computing hardware (such as described with respect to FIG. 10), as well as include one or more components configured to execute the processes described herein to facilitate the docking station based multimedia services of system 100. In one implementation, service management platform 111 includes accounting module 231, communication interface 233, controller (or processor) 227, and memory 229. Platform 111 accesses content repository 123 (FIG. 1) to both store and retrieve usage information. Platform 111 also communicates with the session controller 105.

Service management platform 111 tracks usage of the multimedia system 100 by individual communication devices 101a and 101b. End-users may be billed according to any combination of the following: (i) the amount of data (audio and/or visual) transferred to/from the user's registered devices; (ii) the duration of data transfers; and (iii) the amount of data storage per time.

Figure 3:
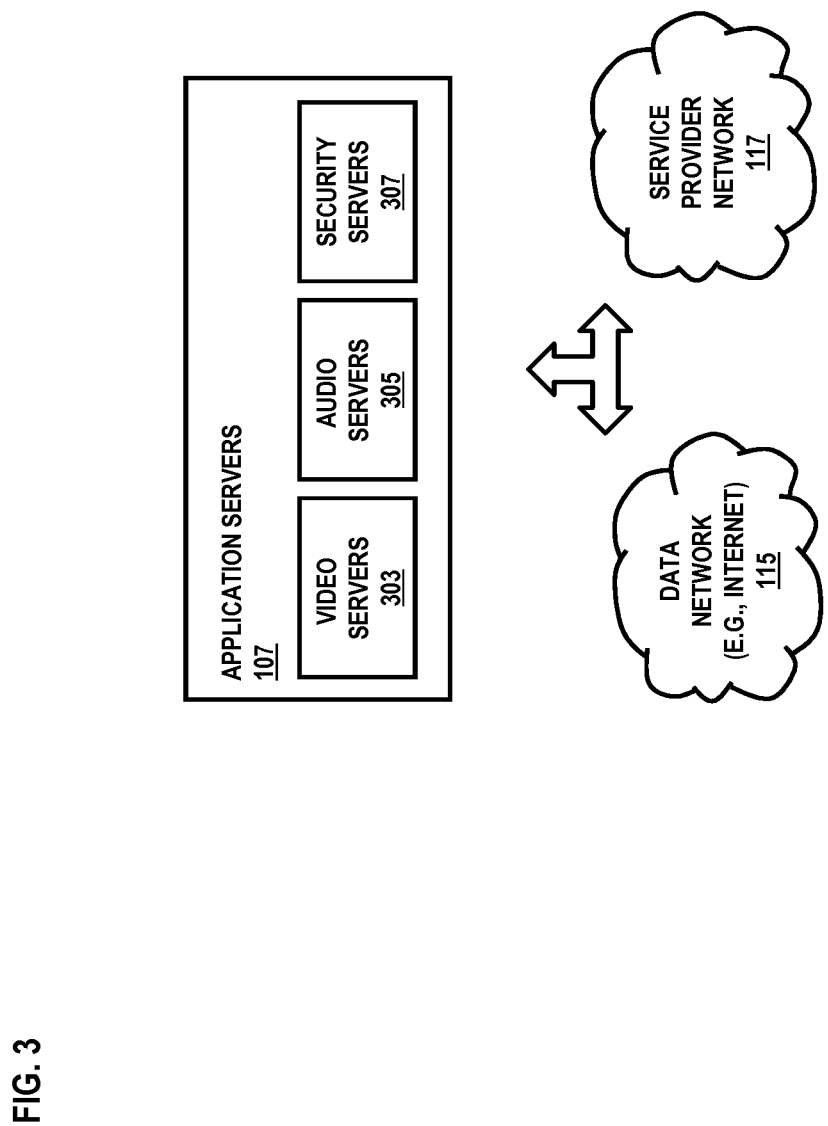
FIG. 3 is diagram of application servers that are configured to facilitate secure, modular multimedia interaction services, according to various exemplary embodiments.

FIG. 3 is diagram of application servers that are configured to facilitate secure, modular multimedia interaction services, according to various exemplary embodiments. The application servers 107 exchange multimedia content with the services gateway 133 (FIG. 1) which may, for example, be a gateway to the public Internet. All such exchanged media passes through the firewall 131 to enhance the security of the service provider components of system 100, which include the application servers 107, session controller 105 and platforms 103, 111 and 109.

As shown in FIG. 3, the application servers comprise video servers 303, audio servers 305, and security servers 307. The video servers 303 process video content. Such processing may include compression/decompression of video data in a variety of codecs. The video servers 303 are capable of simultaneously processing a large number of video streams, and synchronizing combinations thereof. The audio servers 305 process audio content. Such processing may include compression/decompression of audio data in a variety of codecs.

The video servers 303 and the audio servers 305 communicate with session controller 105 to exchange multimedia content between service provider devices, such as mobile devices 101a or 101b, and the services gateway 133.

Security servers 307 may perform a variety of security related functions, such as protecting against denial of service attacks, detecting and preventing intrusions, filtering data content, filtering access to web pages, and email filtering.

Figure 4:
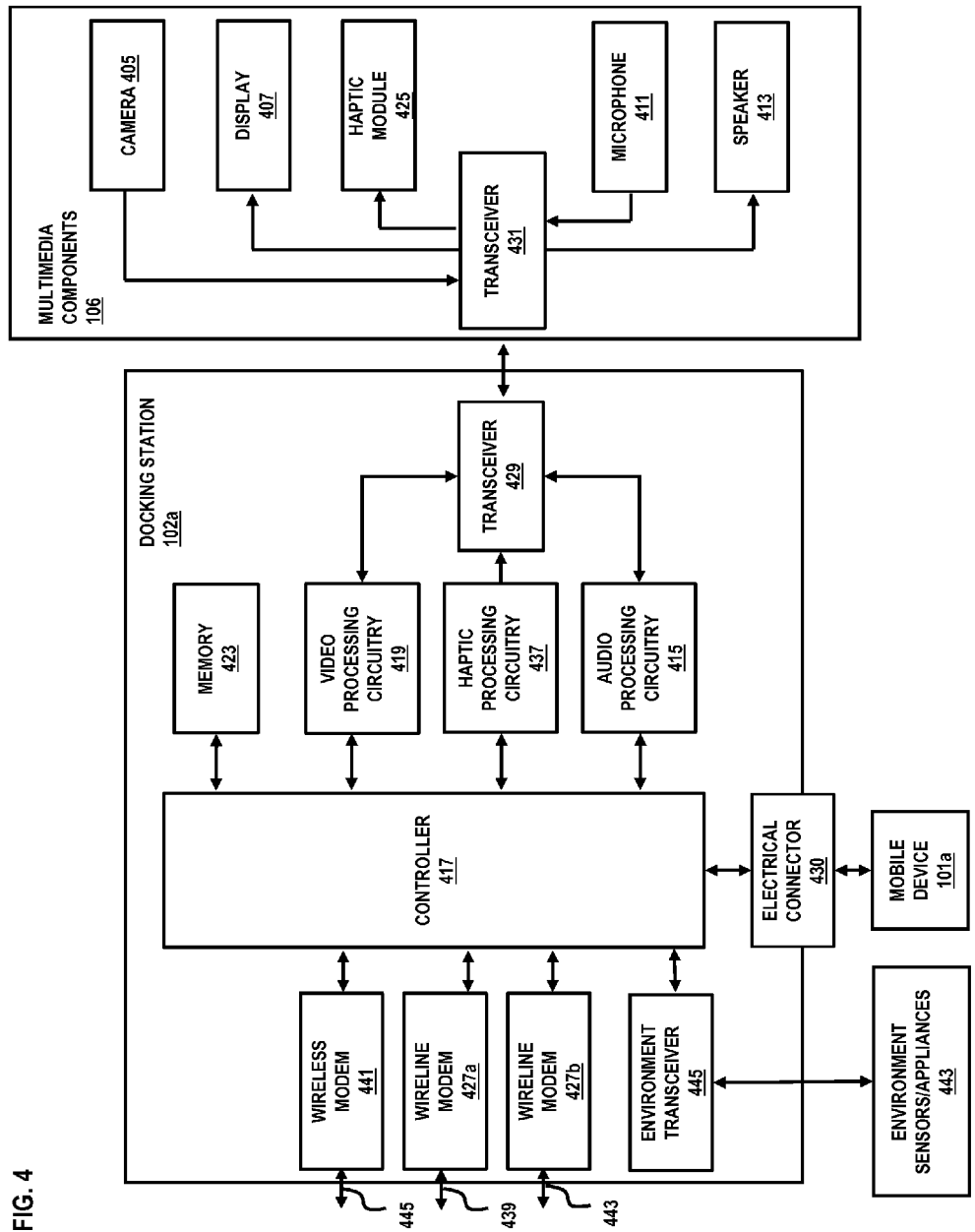
FIG. 4 is a block diagram of a docking station and associated multimedia components that are configured to provide secure, modular multimedia interaction services, according to various exemplary embodiments.

FIG. 4 is a block diagram of a docking station and associated multimedia components that are configured to secure, modular multimedia interaction services, according to various exemplary embodiments. For illustrative purposes, the diagram is described with respect to docking station 102a and multimedia components 106. In this example, docking station 102a includes a controller 417, a memory 423, audio processing circuitry 415, video processing circuitry 419, haptic processing circuitry 437, a transceiver 429, an electrical connector 430, a plurality of wireline modems 427a and 427b, a wireless modem 441, and an environment transceiver 445. While specific reference will be made hereto, it is contemplated that docking station 102a may embody many forms and include multiple and/or alternative components.

The wireline modems 427a and 427b are connected by communication links 439 and 443 to the data network 115 (FIG. 1). The wireless modem 441 is connected by a communication link 445 to the data network 115. The communications links 439, 443 and 445 may comprise any number of wireless and wireline connections connected by any number of hardware devices such as modems, repeaters and servers. For example, the communications link 445 may involve a wireless digital subscriber line (DSL) connection to the data network 115. The wireless modem 441 may communicate over the communication link 445 according to any wireless communication protocol such as Wi-Fi, 3GPP Long Term Evolution (LTE) or the like. The wireline modems 427a and 427b may connect to any type of wireline network. For example, the wireline modems 427a and 427b may connect directly to a local area network (e.g. an Ethernet™ network or an Asynchronous Transfer Mode (ATM) network), which in turn connects to the data network 115. Other types of communication lines, such as fiber optic systems (e.g., FiOS), are possible.

At the onset or during a multimedia exchange session, the controller 417 can assess the availability and responsiveness of communication links 439, 443 and 445, and select an appropriate one of these links accordingly. For example, the controller 417 may determine that the wireline modems 427a and 427b are not connected, but that a wireless router (not shown) is available. In this case, the controller 417 can select the communication link 445 to establish communication with the data network 115.

The controller 417, while referred to in the singular, may comprise one or more controllers, which may include, for example, both general purpose and special purpose controllers and digital signal processors.

According to exemplary embodiments, multimedia components 106 may include one or more camera 405, displays 407, haptic modules 425, microphones 411, and/or speakers 413. Display 407 may comprise a small high definition video screen that displays visual content such as a video or a picture. The display 407 may also be capable of three dimensional (3D), holographic, chroma-key and other types of video rendering. The physical embodiment of the display 407 will be described further with reference to FIG. 7. The display 407 may also provide a graphical user interface (GUI) that permits a user of docking station 102a to view telephone or telephone conference information including dialed digits, call status, menu options, caller ID, and other service information. Camera 405 receives visual input from the surroundings in the form of still pictures and/or videos. The analog visual signal is provided to the docking station 102 through transceivers 431 and 429. The analog visual signal may be processed by video processing circuitry 419 and sent to remote locations (e.g. session controller 105) and/or provided back to the display 407, which may thus perform the function of a viewfinder.

Microphone 411 coverts spoken utterances of a user (or other auditory sounds, e.g., environmental sounds) into electronic audio signals, whereas speaker 413 converts audio signals into audible sounds. According to exemplary embodiments, the speakers 413 are configured in such a manner as to achieve a surround sound effect. Signals from the microphone 411 are provided to the audio processing circuitry 415 through transceivers 431 and 429. Audio signals from the docking station 102a may be provided to the speaker 413 through the transceivers 429 and 431. The audio signals may correspond to speech that occurs during a telephone call, music, text-to-speech signals, and the like. The audio processing circuitry 415 in conjunction with the controller 417 may perform speech recognition, and thereby enable a user to input verbal commands to the docking station 102a. Also, the audio processing circuitry 415 in conjunction with the controller 417 may perform text-to-speech translation, so that information in textual form, e.g., on a web page, may be provided to an end user in audio form.

According to exemplary embodiments, the transceivers 429 and 431 communicate with one another via a BLUETOOTH link The haptic module 425 provides mechanical stimulation (directly or indirectly) to some portion of a user's skin. According to exemplary embodiments, the mechanical stimulation is in the form of a vibration that is applied to the user's skull above the ear, as will be further described with reference to FIG. 7. The controller 417 determines the pattern of mechanical stimulation to be applied and provides the pattern to the haptic processing circuitry 437, which converts a digital representation of the pattern to an analog representation, which is then provided to the haptic module 425 through transceivers 429 and 431. An actuator within the haptic module 425 converts the electrical signal to vibrations.

The docking station 102a may exchange information with a variety of environment specific sensors or appliances 443. For example, sensors/appliances 443 may be medical sensors such as an electrode for recording an electrocardiogram, home monitoring sensors, or security sensors that provide information to the docking station 102a. The docking station 102a may also send information to sensors/appliances 443. For example, the sensors/appliances 443 may be a house light, and the docking station 102a may send a signal through environment transceiver 445 to turn off the light. The sensors/appliances 443 may also be a land line telephone such as voice station 108 (FIG. 1).

The docking station 102a can also receive location information from the environment sensors/appliances 443 and/or the mobile device 101a. For example, the mobile device 101a may determine whether the user is at work, at home, in the car etc. Based on this location information, the docking station 102a may determine the appropriate multimedia components to engage for a particular task. For example, if the user is in a car, the docking station 102a can send audio information to car speakers instead of a headset. If the user is at home, the docking station 102a can send visual information to a television display. Also, the controller 417 can use the location information to determine which of the communication links 439, 443 and 445 to engage according to a location based network preference hierarchy.

The docking station 102*a* is capable of authenticating various components, such as environmental sensors and mobile phones that attempt to communicate with it. In this regard, the memory 423 may store device specific identification information. When that device first attempts to communicate with the docking station 102*a*, the controller 417 may check whether that device is within its list of authorized devices.

The docking station 102*a* can also perform user specific authorization by requiring a user to input a password, biometric information etc., which may be analyzed by the controller 417 in conjunction with any combination of the audio processing circuitry 415, which may assist with speech recognition, and the video processing circuitry 419, which may assist with various visual recognition tasks such as retinal identification, or other types of circuitry capable of analyzing biometric data. This user specific identification may be in addition to, or occur instead of, the authorization performed by authentication platform 103 (FIG. 1).

Memory 423 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 423 may be implemented as one or more discrete devices, stacked devices, or integrated with controller 417. Memory 423 may store information, such as a unique number that serves to identify the docking station 102*a*, one or more user profiles, one or more user defined policies, one or more contact lists, authorized device lists (as described above), personal information, sensitive information, work related information, configurable telephony parameters, and the like.

Docking station 102*a* is electrically coupled to mobile phone 101*a* through an electrical connector 430. The mobile device 101*a* may serve as a mobile telephone, in which case, according to exemplary embodiments, analog audio signals received through the wireless network 121 (FIG. 1) are converted to digital form by the mobile device 101*a* and provided to the controller 417 through electrical connector 430. According to alternative embodiments, the docking station 102*a* may act as a passive carrier of analog audio signals, which are directly transmitted through transceiver 429 without any intervening processing by the docking station 102*a*. The controller 417 provides the audio signal to audio processing circuitry 415, which converts them to analog and sends them to speaker 413 through transceivers 429 and 431. Audio input to the microphone 411 follows the same pathway in the opposite direction, and is transmitted by mobile device 101*a* through the wireless network 121 (FIG. 1). Visual content may be added to calls by employing the camera 405 for outgoing images and the display 407 for incoming images.

The mobile device 101*a* may also exchange multimedia content between the docking station 102*a* and the content repository 135 and/or the services gateway 133. Such content may include, without limitation, music, videos, pictures, web pages, and the like.

The mobile device 101*a* may also serve as the communications link that performs all or part of the authentication process performed by the authentication platform 103 (FIG. 1). In this case, authentication data provided by an end user via, for example, the microphone 411, the camera 405 or by a keypad (not shown), is provided to the authentication platform 103 through the wireless network 121, the service provider network 117 and session controller 105. The data network 115 may also serve as an intermediate communication link between the wireless network 121 and service provider network 117. The authentication process may involve the transfer of information from authentication platform 103 (FIG. 1) to the multimedia components 106, in which case the above described communication links are employed in the reverse direction.

Instead of, or in addition to, the mobile device 101*a* being involved in the authentication process, all or part of the authentication process may be carried out through the data network 115 and service provider network 117 via one of the modems 427*a*, 427*b* or 441. In this case, authentication information received by multimedia components 106 is provided to the pertinent modem by the controller 417, which in turn receives the data through transceivers 431 and 429. Audio and visual authentication information are processed by video processing circuitry 419 and audio processing circuitry 415 respectively. Other types of authentication information, such as passwords, may be received by docking station 102*a* through a keyboard (not shown) and provided to one of the modems 427*a*, 427*b* or 441 for transmission to the data network 115. Again, authentication information may be transferred either to or from the authentication platform 103.

It is noted that the above mentioned control signals may be used in lieu of "software code," and therefore, may be directly integrated into the control logic of docking station 102*a*. In this manner, execution of certain ones of these control messages may require less processing than execution of conventional coded instructions. It is contemplated, however, that such conventional coded instructions may also be utilized. As such, these control messages may be utilized by docking station 102*a* to facilitate the multimedia services of system 100.

According to alternative embodiments, the multimedia components 106 may include a controller, and any combination of audio, haptic and video processing circuitry or other circuitry for processing any type of signals. In this case, the multimedia components 106 could perform functions previously described with respect to the docking station 102*a*, such as text-to-speech and speech recognition.

Figure 5:
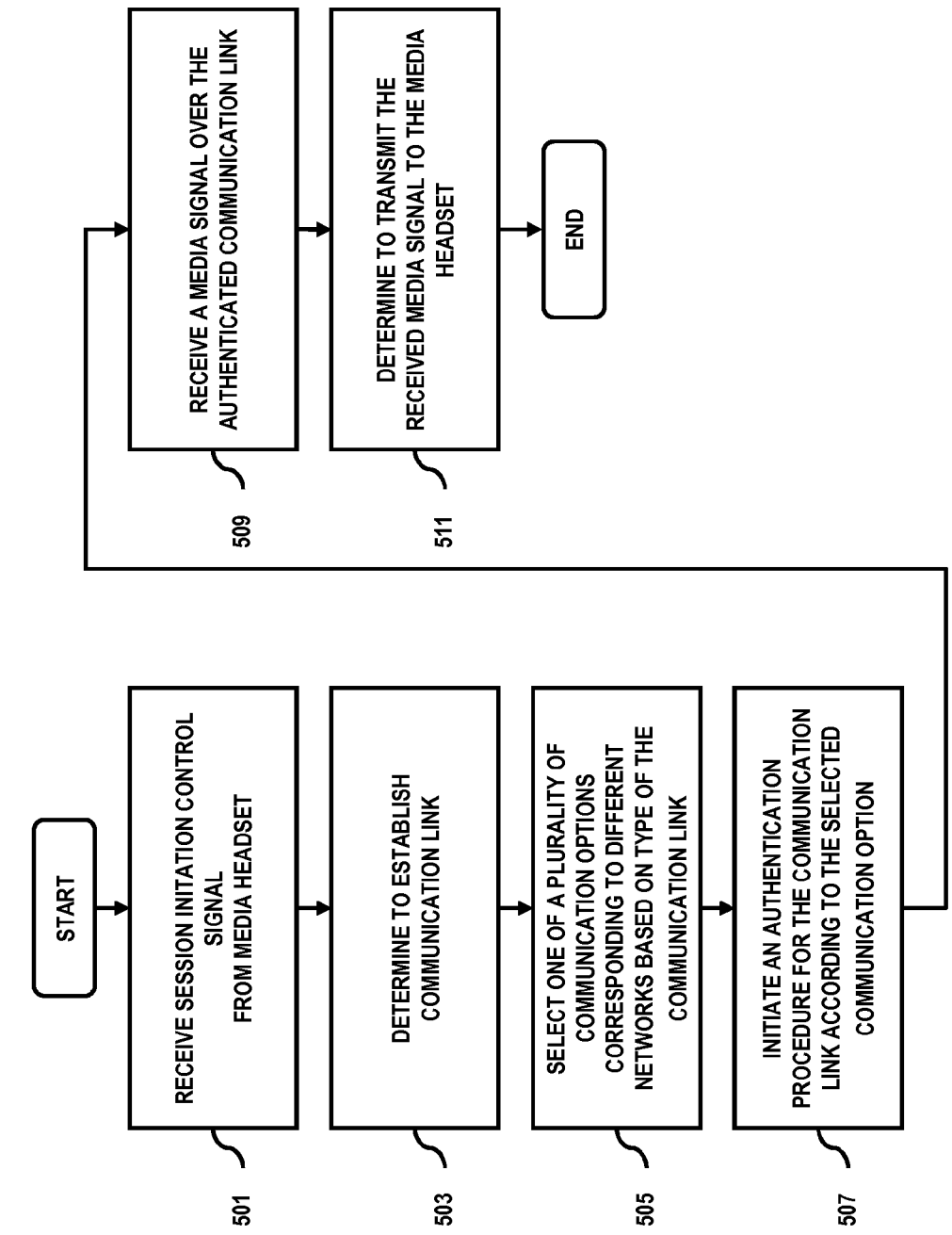
FIG. 5 is a flowchart of a process for providing secure, modular multimedia interaction services via a docking station, according to an exemplary embodiment.

FIG. 5 is a flowchart for a process for providing secure, modular multimedia interaction services via a docking station, according to an exemplary embodiment. For illustrative purposes, the process is described with respect to FIGS. 1 and 4, and with respect to docking station 102*a*. It is noted that the steps of the process may be performed in any suitable order, as well as combined or separated in any suitable manner. At step 501, docking station 102*a* receives a session initiation control signal from a media headset, which may comprise some or all of the multimedia components 106 or 110. An exemplary headset will be described with reference to FIG. 7. According to the docking station embodiment shown in FIG. 4, the control signal, which may correspond to a voice command or a visual command, is received through transceiver 429 and routed to video processing circuitry 419 or audio processing circuitry 415, whichever is pertinent. However, other types of control signals are possible, including without limitation control signals that correspond to commands entered by a user interacting with a graphical user interface (GUI) via an alphanumeric keypad or other input controls, such as one or more button controls, dials, joysticks, touch panels, etc. Control signals may also be provided by other types of sensors and modalities, including, without limitation, gesture recognition.

Referring again to FIG. 5, in step 503, the docking station 102*a* determines whether to establish a communication link. The determination is made by the controller 417 (FIG. 4). Next, in step 505, the docking station 102*a* selects one of a plurality of communication options corresponding to different networks based on type of the communication link. For example, as previously described with reference to FIG. 4, authentication related communications may be sent via the mobile device 101a through wireless network 121, or through the modem 427 via the data network 115. Also as previously discussed, the controller 417 may select any one of the communication links 439, 443 and 445, and a corresponding one of the modems 427a, 427b and 441, according to a number of criteria, including availability, location based network preferences, etc.

Next, in step 507, the docking station 102a initiates an authentication procedure for the communication link according to the selected communication option. The authentication procedure may involve any combination of at least various types of procedures, including authentication of device or user information by the docking station 102a, by one of the access networks 115, 117, 119 and 121, or by the authentication platform 103 (FIG. 1). Subsequently, the docking station 102a receives a media signal over the authenticated communication link. In step 511, the docking station 102a determines to transmit the received media signal to the media headset.

Figure 6:
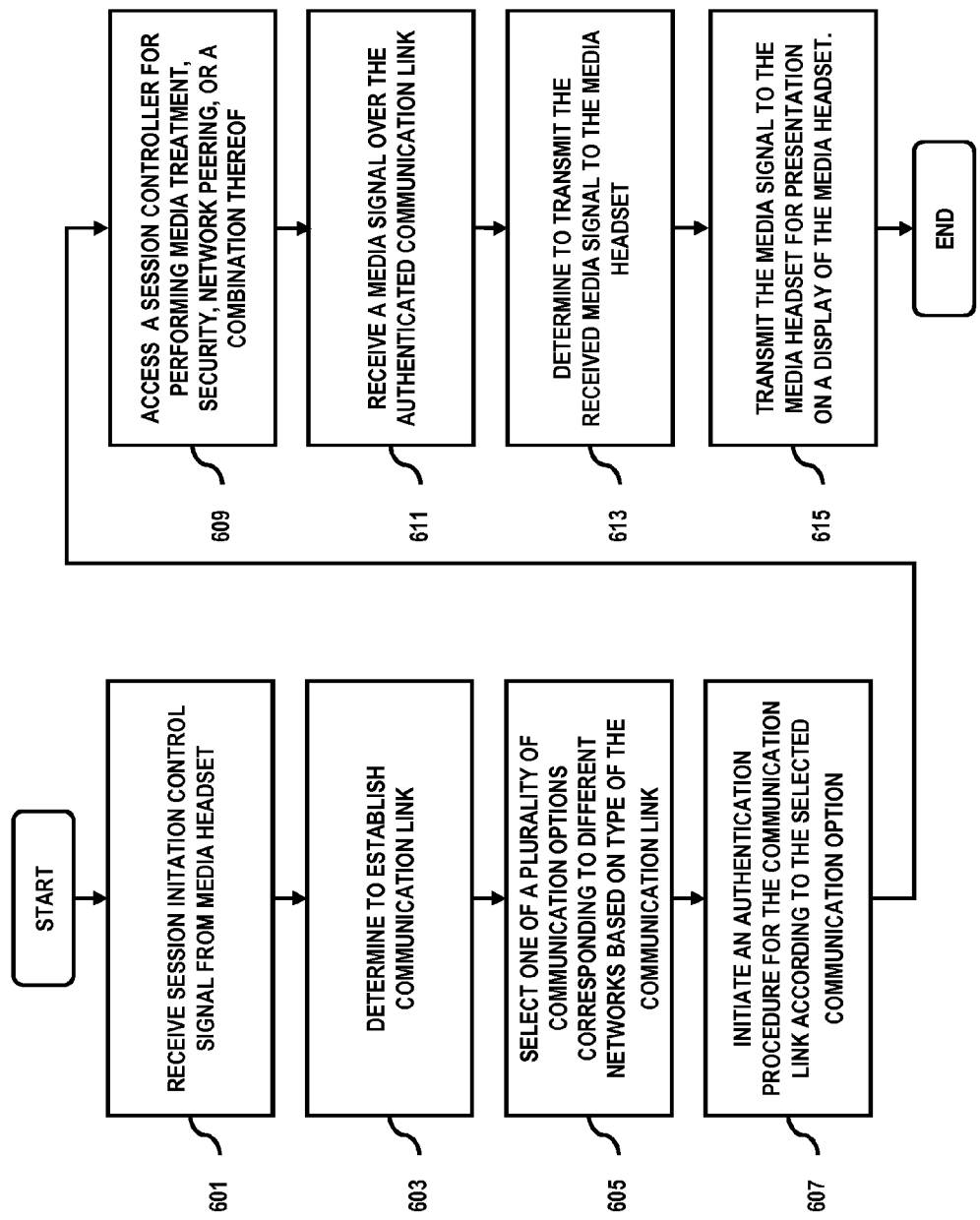
FIG. 6 is a flowchart of a process for providing secure, modular multimedia interaction services via a docking station and a session controller, according to an exemplary embodiment.

FIG. 6 is a flowchart for a process for providing secure, modular multimedia interaction services via a docking station and a session controller, according to an exemplary embodiment. For illustrative purposes, the process is described with respect to FIGS. 1, 2A, 3 and 4, and with respect to docking station 102a. At step 601, which is identical to step 501 (FIG. 5), docking station 102a receives a session initiation control signal from a media headset, which may comprise some or all of the multimedia components 106 or 110. Next, in step 603, which is identical to step 503 (FIG. 5), the docking station 102a determines whether to establish a communication link. Next, in step 605, which is identical to step 505 (FIG. 5), the docking station 102a selects one of a plurality of communication options corresponding to different networks based on type of the communication link; these options, for example, may include WiFi, cellular, etc. Next, in step 607, which is identical to step 507 (FIG. 5), the docking station 102a initiates an authentication procedure for the communication link according to the selected communication option.

Subsequently, in step 609, the docking station 102a accesses the session controller 105 for performing media treatment, security, network peering, or a combination of these functions. Specifically, session controller 105 communicates with authentication platform 103 to perform authentication related security services. Session controller 105 also communicates with security servers 307 (FIG. 3) for the purpose of providing security services described with respect to FIG. 3. The session controller 105 coordinates media conditioning by communicating with the video servers 303 and the audio servers 305. The session controller 105 provides network peering by coordinating the exchange of content by and between the mobile devices 101a and 101b, and devices connected to the services gateway 133. Peering is facilitated by the content repository 135, which stores content associated with mobile devices 101a and 101b under the direction of content, storage distribution and management platform 109. The session controller 105 may interact with platform 109 to perform peering.

Referring again to FIG. 6, step 611 is performed. According to step 611, which is identical to step 509 of FIG. 5, the docking station 102a receives a media signal over the authenticated communication link. Next, in step 613, which is identical to step 511 (FIG. 5), the docking station 102a determines to transmit the received media signal to the media headset.

Next, in step 615, the docking station 102a transmits the media signal to the media headset for presentation on a display of the media headset.

Figure 7:
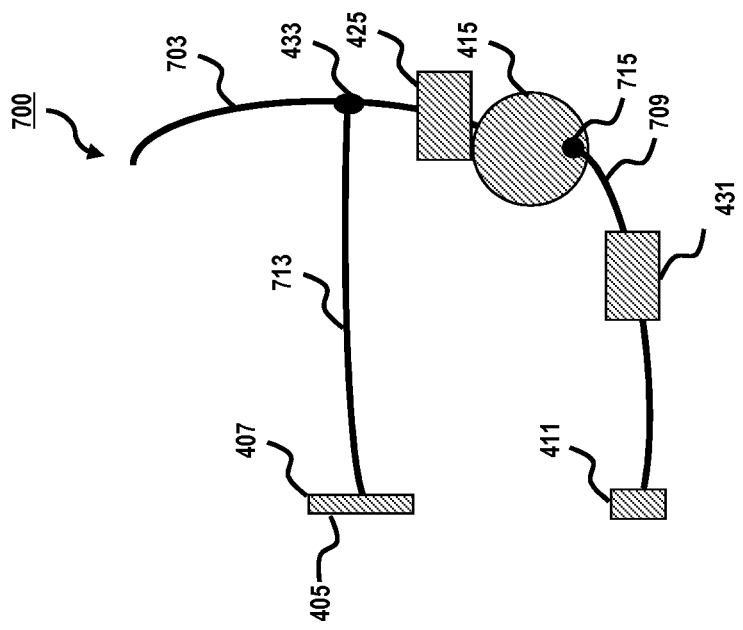
FIG. 7 is a diagram of a modular, multimedia headset, according to an exemplary embodiment.

FIG. 7 is a diagram of a headset comprising multimedia components, according to an exemplary embodiment. A headset 700 comprises a band or frame 703, the speaker 415 (FIG. 4) in the form of an earpiece attached thereto, and a boom member 709 coupled by a swivel joint 715 to the speaker/earpiece 415. The display 407 (FIG. 4) is mounted to an arm 713 that is attached to the band 703 by a swivel joint 433 such that the display 407 is in the appropriate location to provide visual content to one eye (or both eyes if display 407 is large enough to be viewed by both eyes) of a wearer of the headset 700. The arm 713 may be swiveled about the swivel joint 433, and may also be easily detached from the frame 703 at the swivel joint 433. Similarly, the boom member 709 is also detachable. According to exemplary embodiments, the display 407 is formed from a flexible material.

The camera 405 (FIG. 4) is attached to, or formed integral with, the display 407. The haptic module 425 is attached to the band 703 just above the speaker/earpiece 415 such that the haptic module 425 touches the head of a wearer of the headset 700. The microphone 411 (FIG. 4) is attached to the distal end of the boom member 709. The transceiver 431 is attached to a medial area of the boom member 709. (If the boom member 709 is detached, the transceiver 431 may be attached directly to the frame 703.) Wires (not shown) connect the transceiver 431 with the microphone 411, the speaker 415, the haptic module 425, the display 407 and the camera 405.

Figure 8:
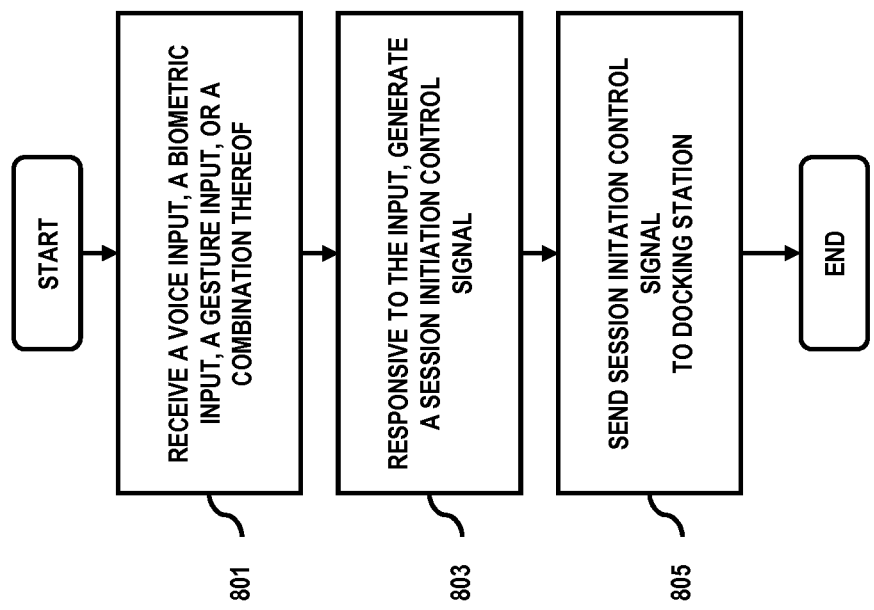
FIG. 8 is a flowchart of a process for receiving user input from a variety of modalities, and for interfacing with a docking station, according to an exemplary embodiment.

FIG. 8 is a flowchart for a process for receiving user input from a variety of modalities, and for interfacing with a docking station, according to an exemplary embodiment. For illustrative purposes, the process is described with respect to FIGS. 1 and 7. In step 801, multimedia components such as multimedia components 106 and 110 receive a voice input, a biometric input, a gesture input, or a combination thereof. In an embodiment wherein the multimedia components comprise a headset such as the one shown in FIG. 7, the voice input may be acquire by microphone 411 and visual biometric input may be acquired through camera 405. Other types of biometric input through a variety of other types of sensors are possible. For example, such sensors may comprise accelerometers for detecting motion, magnetic compass for determining direction, pressure sensors for detecting touch, or chemical sensors for detecting molecules that may help to identify an individual.

According to step 803, responsive to the input received in step 801, a session initiation control signal is generated. Next, in step 805, the session initiation control signal is sent to a docking station, such as docking station 102a (FIG. 1). According to the embodiments shown in FIGS. 4 and 7, the control signal is sent to docking station 102a through the transceiver 411.

Figure 9:
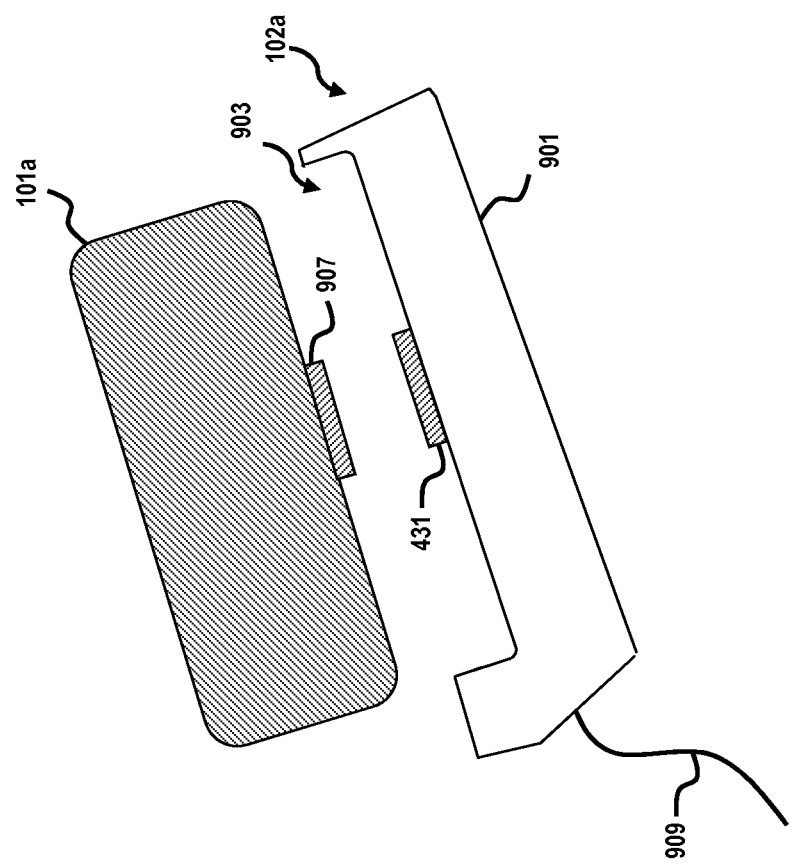
FIG. 9 is a diagram of a docking station and an associated mobile telephony device, according to an exemplary embodiment.

FIG. 9 is a diagram of a docking station and an associated mobile telephony device, according to an exemplary embodiment. For illustrative purposes, the figure will be described with reference to docking station 102a and mobile device 101a, each as shown in FIG. 1. The docking station 102a comprises an elongate frame 901 with an angled front face and a slot 903 for receiving the mobile phone 101a. The docking station 102a and mobile phone 101a include electrical connectors 431 (see FIGS. 4) and 907 respectively that mate with one another to establish an electrical connection between the docking station 102a and the mobile phone 101a. The docking station 102, according to certain embodiments, also include the capability to employ a wired network connection, e.g., via an Ethernet cable, and/or a wireless connection.

The docking station 102a includes a cord 909 that may be used to provide power to the docking station 102a. The docking station 102a may also include a compartment (not shown) that houses batteries that provide power. The mobile phone 101a may be charged through the electrical connections 431 and 907.

According to certain embodiments, the described arrangement and associated processes can minimize user radiation exposure and device weight to be worn by the user. Furthermore, by way of example, in a car environment, a macro cellular radio antenna can be deployed outside of the passenger compartment (thus minimizing the radiation exposure inside the car and providing better radio reception with less power required).

Also, the docking station, as "smart" stations, can leverage the appropriate network and environmental resources, including IMS capabilities. Network resources can be accessed on a "need-to-know" basis. Further, support for "invisible" components (e.g., speakerphone, speakers, cameras, etc.) can be provided (e.g., components are "hidden" in the user's environment).

The processes described herein for providing secure, modular multimedia transactions over a wireless network may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
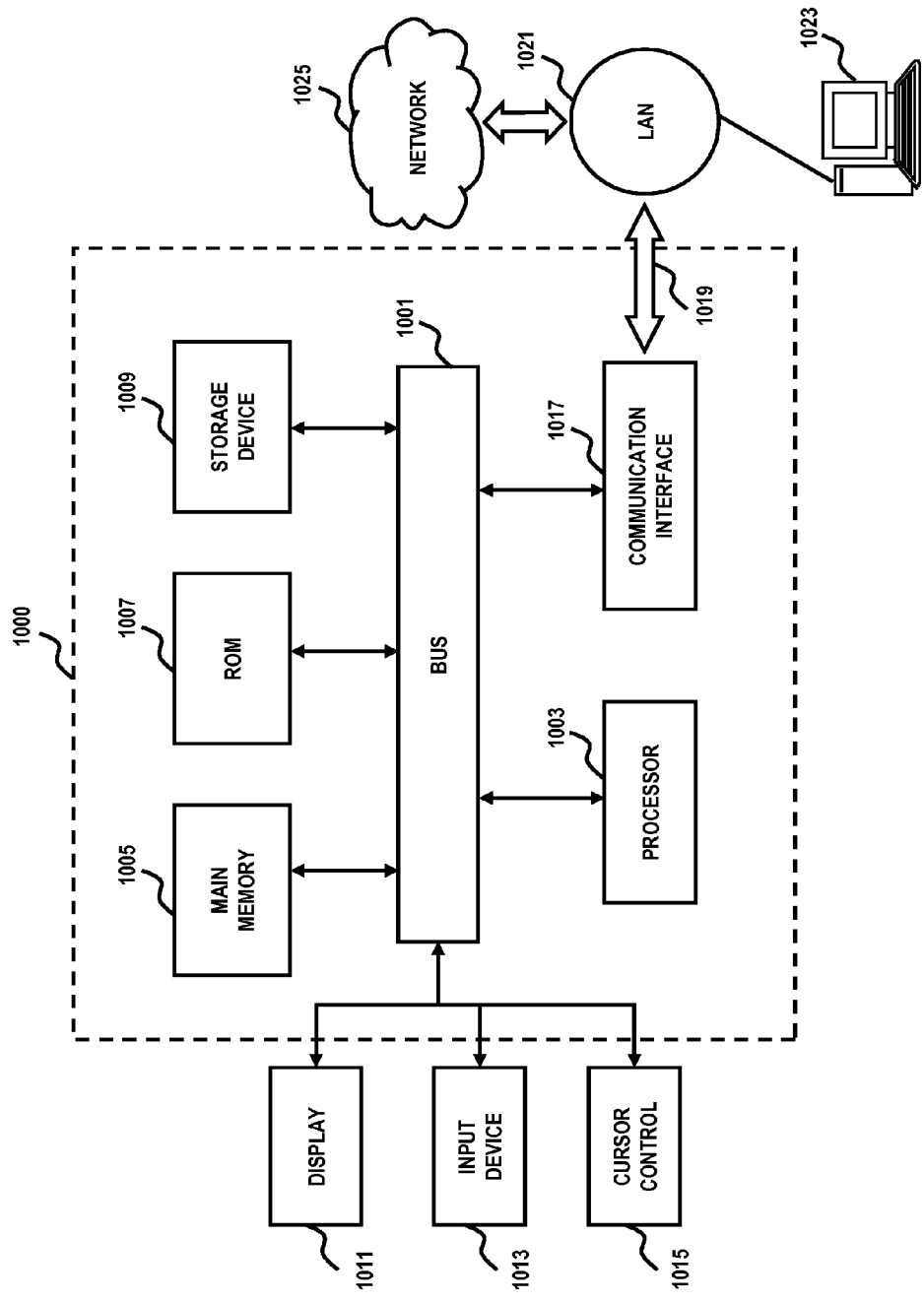
FIG. 10 is a diagram of a computer system that can be used to implement various exemplary embodiments.

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
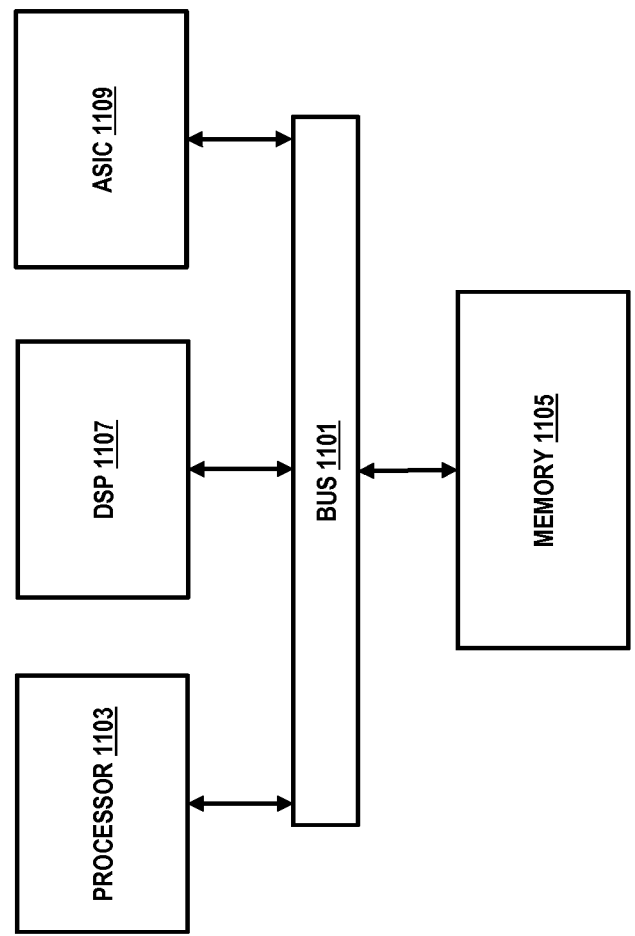
FIG. 11 is a diagram of a chip set that can be used to implement an embodiment of the invention.

FIG. 11 illustrates a chip set or chip 1000 upon which an embodiment of the invention may be implemented. Chip set 1100 is programmed to enable secure, modular multimedia interaction services as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a base-board) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of enabling secure, modular multimedia interaction services.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to enable secure, modular multimedia interaction services. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A method comprising:
   receiving, at a docking station that is registered with an authentication platform of a service provider network allowing the docking station to connect to services of the service provider network, a control signal from a media headset in response to a voice input, a biometric input, a gesture input, or a combination thereof;
   determining in response to the control signal at the docking station, to establish a communication link;
   selecting, by the docking station, one of a plurality of communication options corresponding to different networks based on the type of the communication link;
   initiating, by the docking station, an authentication procedure for the communication link according to the selected communication option;
   accessing a session controller on a service provider side of the service provider network that is in communication with the docking station, to perform a plurality of services including media treatment, security, network peering, or a combination thereof;
   receiving a media signal over the authenticated communication link;
   determining based on received location information from an environment sensor or a mobile device by the docking station, a particular multimedia component of a plurality of multimedia components to engage to perform a particular task associated with the media signal;
   determining to transmit the received media signal to the particular multimedia component; and transmitting the media signal to the media headset for presentation on a display of the media headset in response to the determination that the particular multimedia component is the media headset and the particular task is displaying, wherein the docking station includes an electrical connector adapted to connect to the mobile device, one or more wireline modems, a wireless modem, an environment transceiver adapted to connect to environment sensors or appliances, and a transceiver adapted to connect to one or more of the plurality of multimedia components.

2. A method according to claim 1, wherein the display includes a flexible display.

3. A method according to claim 1, wherein the different networks comprise a wireless network, a telephony network, a data network, or a combination thereof.

4. A method according to claim 1, wherein the media signal comprises audio and video data.

5. A method according to claim 1, wherein the session controller is connected to a service management platform on the service provider side of the service provider network.

6. An apparatus comprising:
at least one processor; and
at least one memory including computer program code for one or more programs,
the at least one memory and the computer program code configured to, with the at least one processor, cause the apparatus to perform at least the following,
receive, at a docking station that is registered with an authentication platform of a service provider network allowing the docking station to connect to services of the service provider network, a control signal from a media headset in response to a voice input, a biometric input, a gesture input, or a combination thereof;
determine in response to the control signal at the docking station, to establish a communication link;
select, by the docking station, one of a plurality of communication options corresponding to different networks based on type of the communication link;
initiate, by the docking station, an authentication procedure for the communication link according to the selected communication option;
access a session controller on a service provider side of the service provider network that is in communication with the docking station, to perform a plurality of services including media treatment, security, network peering, or a combination thereof;
receive a media signal over the authenticated communication link;
determine based on received location information from an environment sensor or a mobile device by the docking station, a particular multimedia component of a plurality of multimedia components to engage to perform a particular task associated with the media signal;
determine to transmit the received media signal to the particular multimedia component; and
transmit the media signal to the media headset for presentation on a display of the media headset in response to the determination that the particular multimedia component is the media headset and the particular task is displaying,
wherein the apparatus includes an electrical connector adapted to connect to the mobile device, one or more wireline modems, a wireless modem, an environment transceiver adapted to connect to environment sensors or appliances, and a transceiver adapted to connect to one or more of the plurality of multimedia component.

7. An apparatus according to claim 6, wherein the display includes a flexible display.

8. An apparatus according to claim 6, wherein the different networks comprise a wireless network, a telephony network, a data network, or a combination thereof.

9. An apparatus according to claim 6, wherein the media signal comprises audio and video data.

10. An apparatus according to claim 6, wherein the session controller is connected to a service management platform on the service provider side of the service provider network.

11. A system comprising:
a plurality of multimedia components;
a docking station that is registered with an authentication platform of a service provider network allowing the docking station to connect to services of the service provider network, and being configured to receive a control signal from a media headset in response to a voice input, a biometric input, a gesture input, or a combination thereof,
the docking station being further configured to determine in response to the control signal to establish a communication link, to select one of a plurality of communication options corresponding to different networks based on type of the communication link, to initiate an authentication procedure for the communication link according to the selected communication option; and
a session controller on a service provider side of a service provider network that is in communication with the docking station, and being accessed to perform a plurality of services including media treatment, security, network peering, or a combination thereof,
the docking station being further configured to receive a media signal over the authenticated communication link, to determine, based on received location information from an environment sensor or a mobile device, a particular multimedia component of the plurality of multimedia m onents to engage to perform a particular task associated with the media signal, to determine to transmit the received media signal to the particular multimedia component, and to transmit the media signal to the media headset for presentation on a display of the media headset in response to the determination that the particular multimedia component is the media headset and the particular task is displaying,
wherein the docking station includes an electrical connector adapted to connect to the mobile device, one or more wireline modems, a wireless modem, an environment transceiver adapted to connect to environment sensors or appliances, and a transceiver adapted to connect to one or more of the plurality of multimedia components.

12. A system according to claim 11, wherein the display includes a flexible display.

13. A system according to claim 11, wherein the different networks comprise a wireless network, a telephony network, a data network, or a combination thereof.

14. A system according to claim 11, wherein the media signal comprises audio and video data.

15. A system according to claim 11, wherein the session controller is connected to a service management platform on the service provider side of the service provider network.

* * * * *